UNITED STATES PATENT OFFICE.

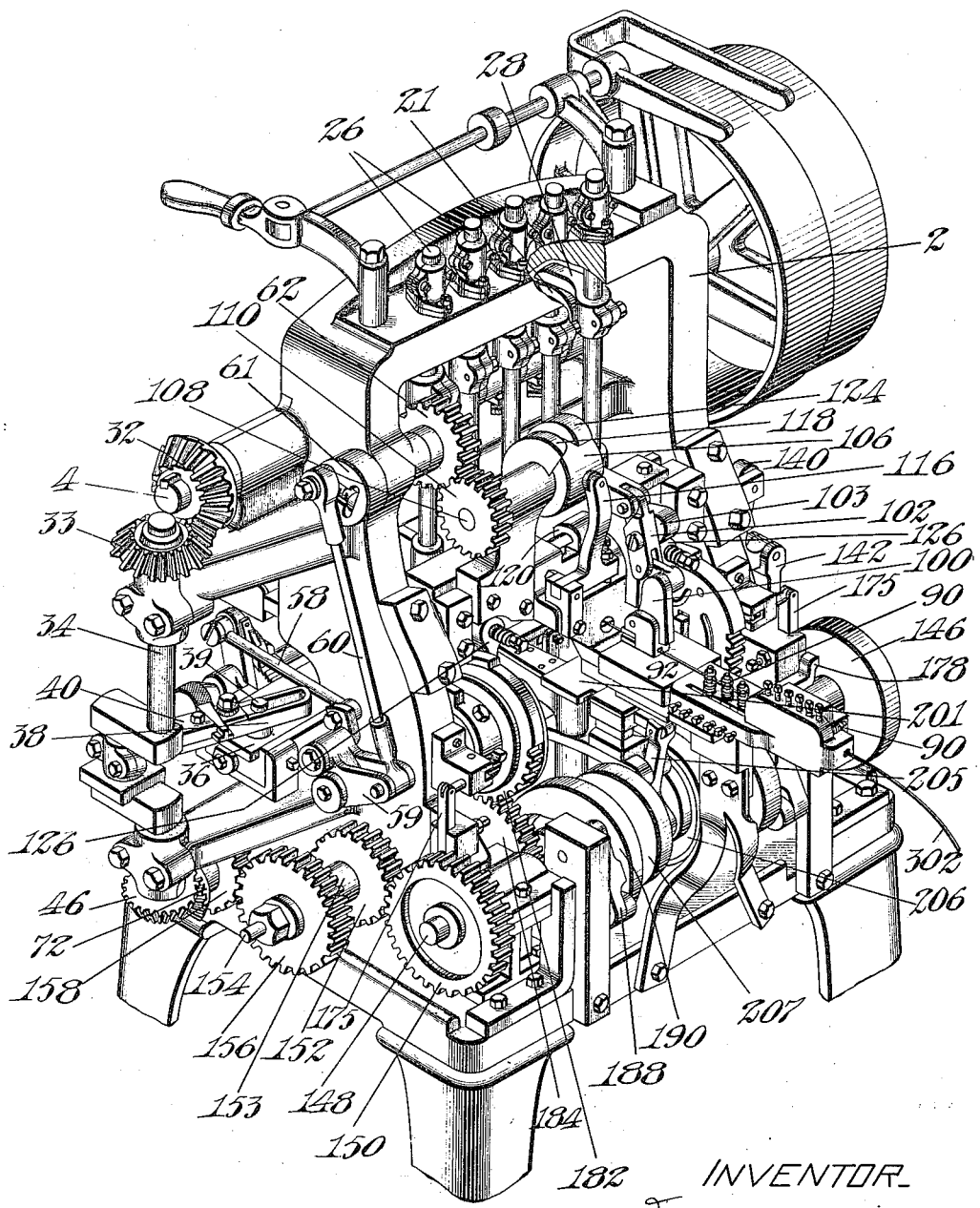

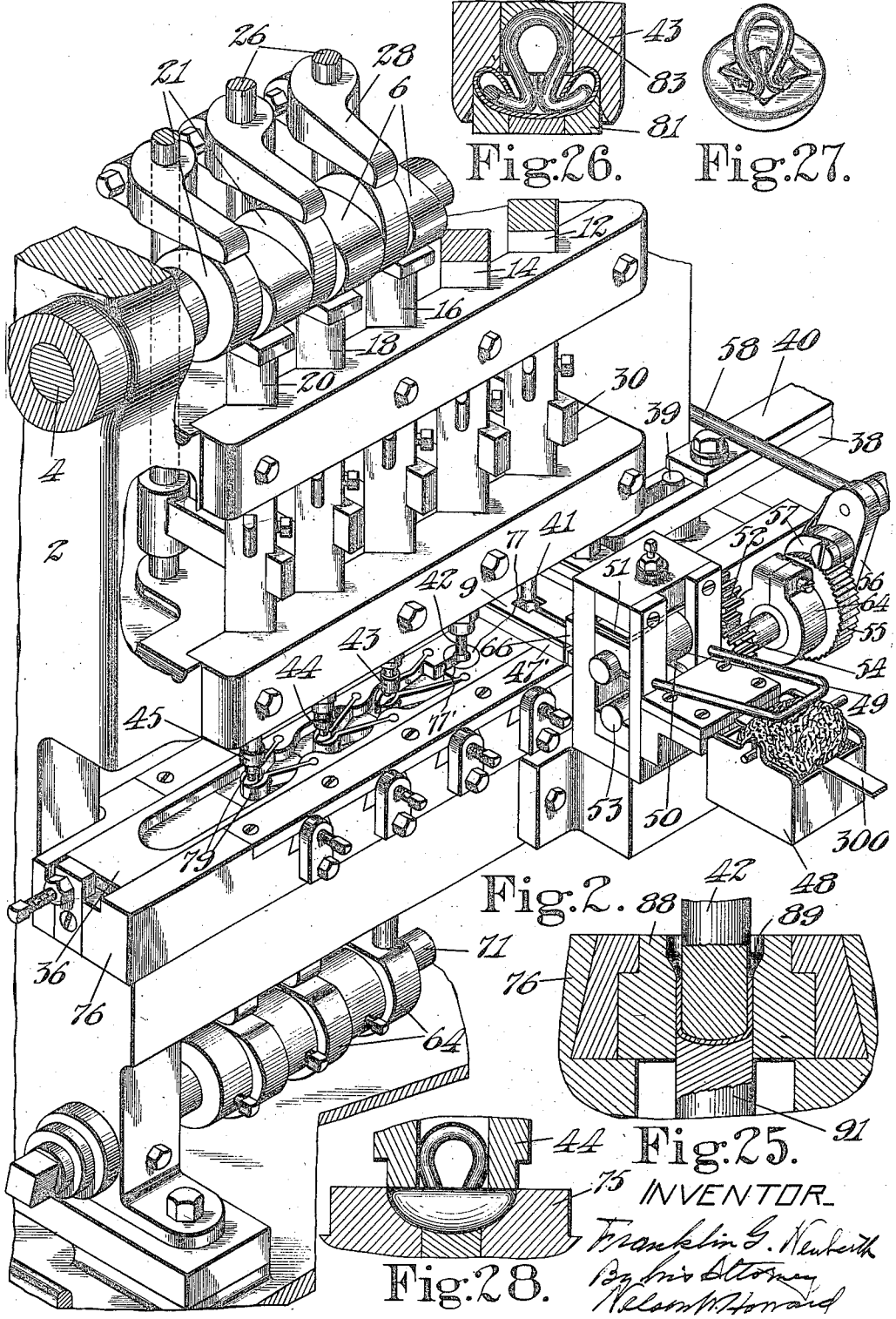

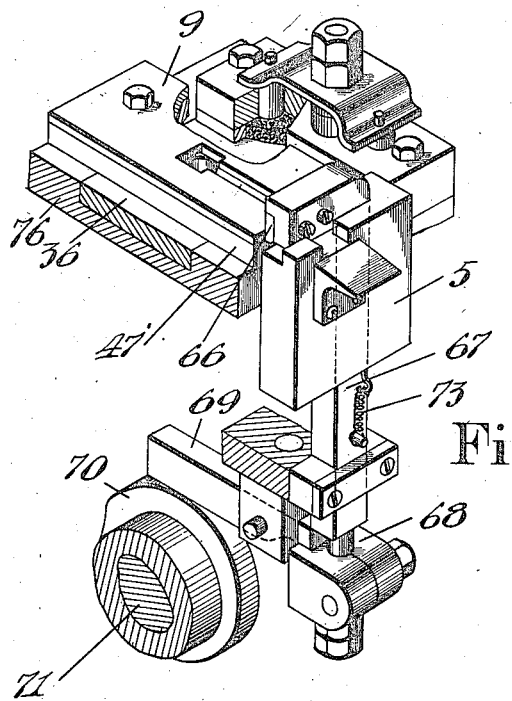
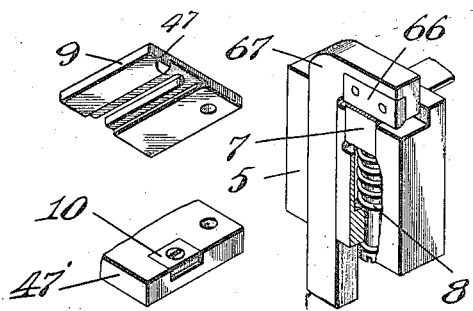
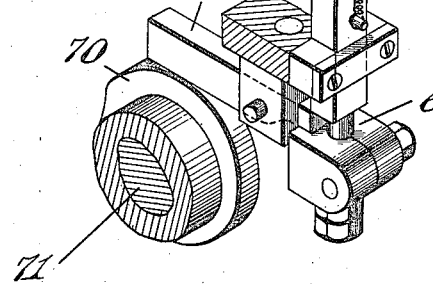
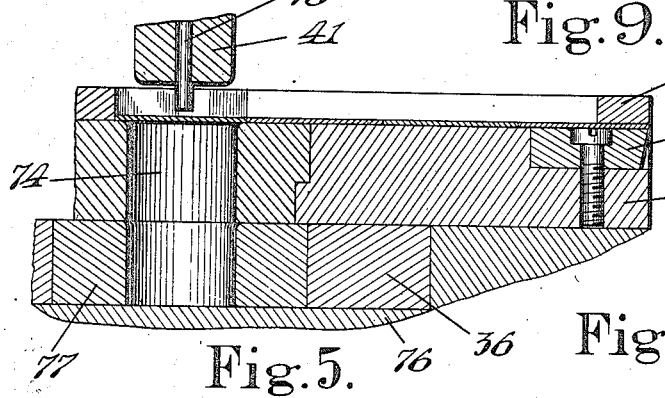
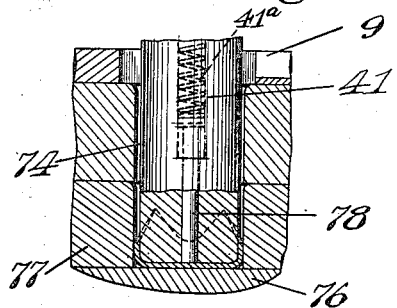
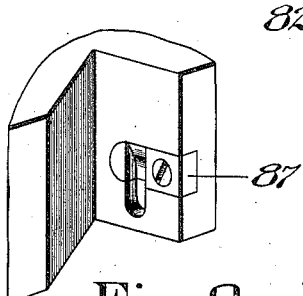

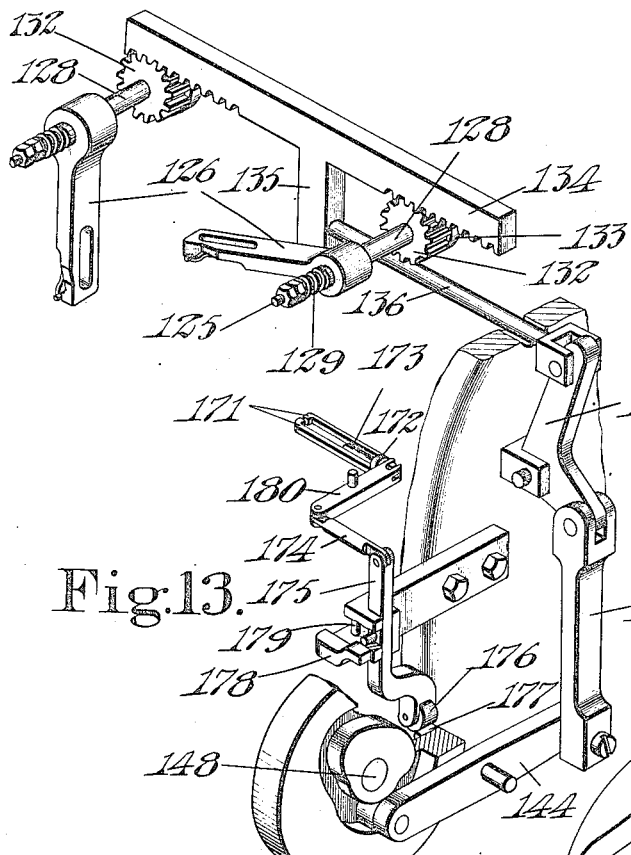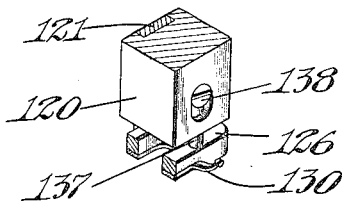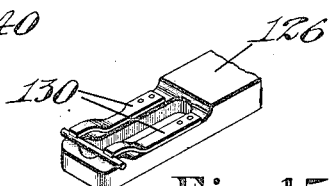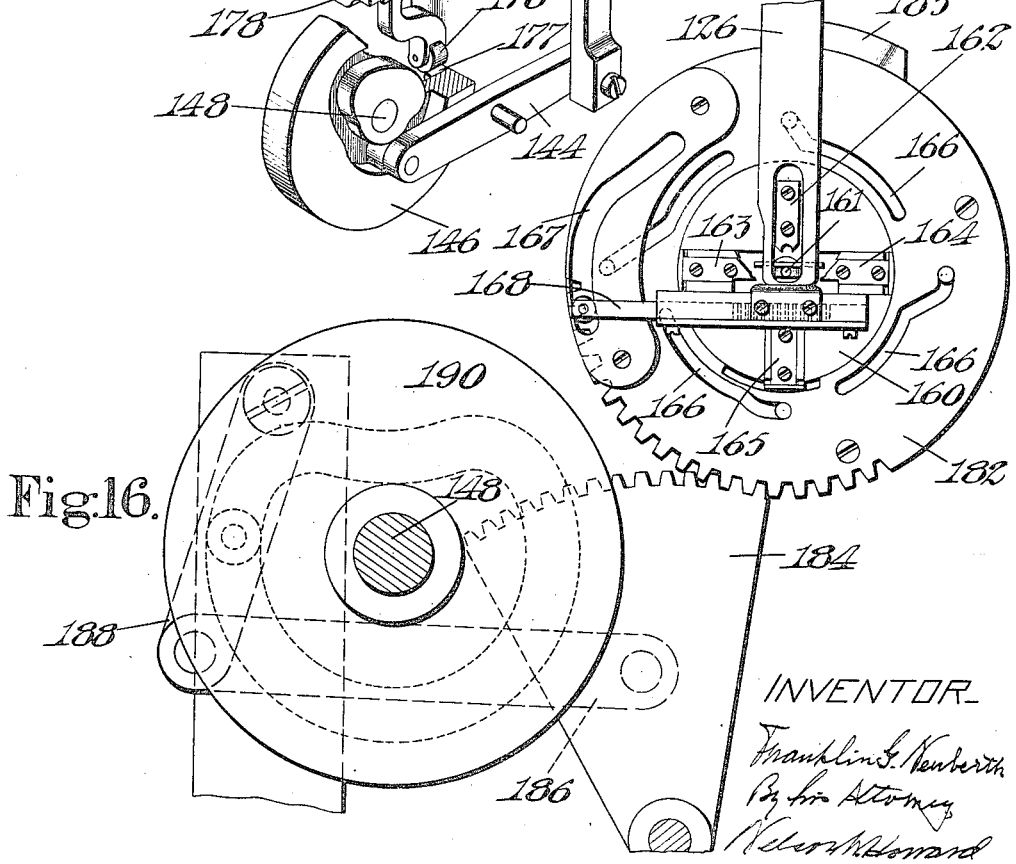

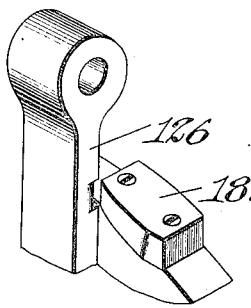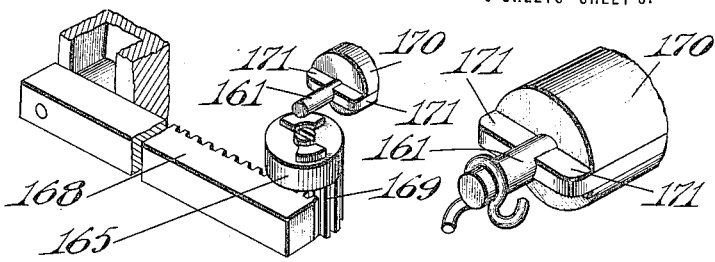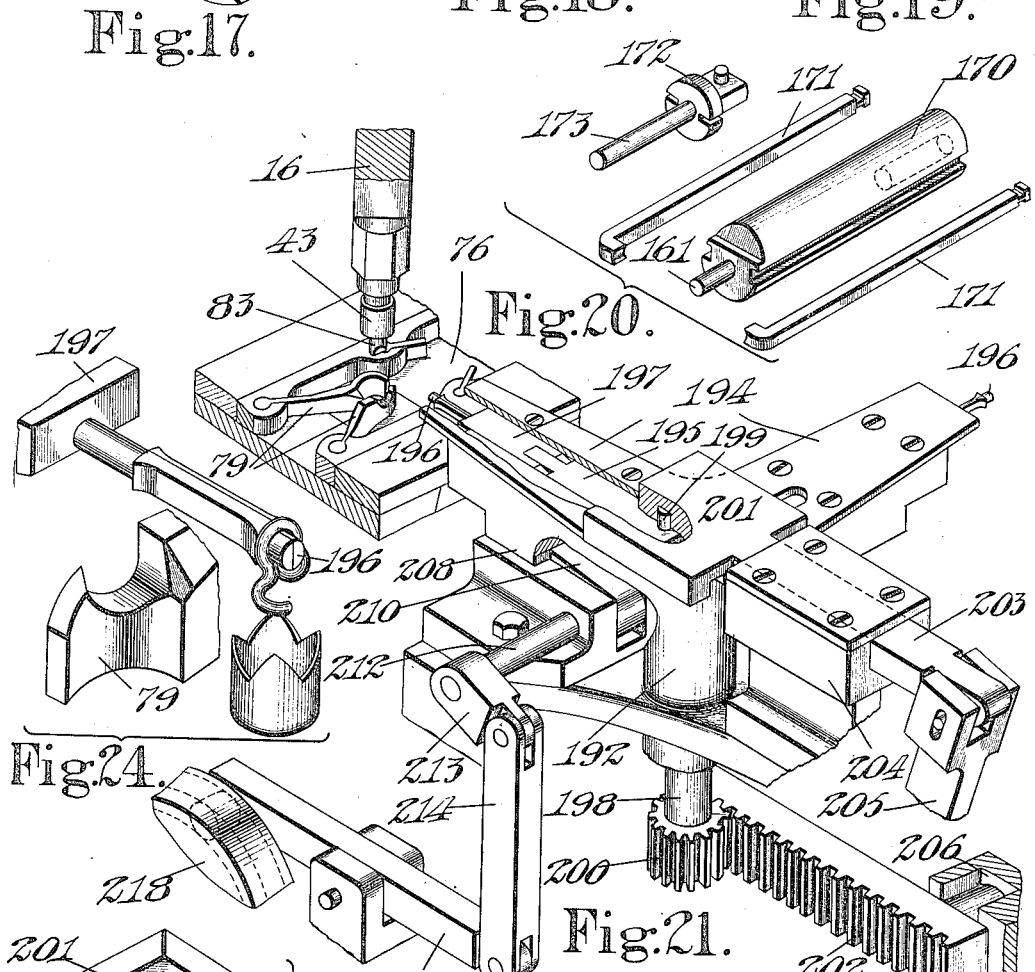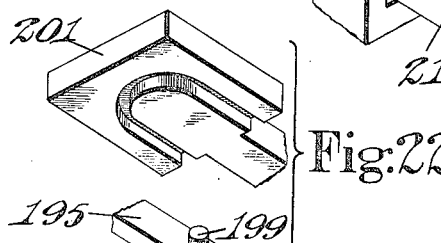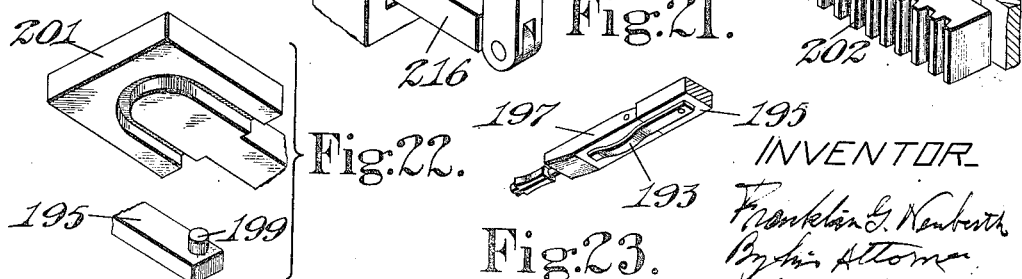

FRANKLIN G. NEUBERTH, OF ANSONIA, CONNECTICUT, ASSIGNOR TO THE S. O. & C. CO., OF ANSONIA, CONNECTICUT, A CORPORATION OF CONNECTICUT.

BUTTON-MAKING MACHINE.

1,299,763.  Specification of Letters Patent.  Patented Apr. 8, 1919.

Application filed July 6, 1915. Serial No. 38,203.

*To all whom it may concern:*

Be it known that I, FRANKLIN G. NEUBERTH, a citizen of the United States, residing at Ansonia, in the county of New Haven and State of Connecticut, have invented certain Improvements in Button-Making Machines, of which the following description, in connection with the accompanying drawings, is a specification, like reference characters on the drawings indicating like parts in the several figures.

This invention relates to machines for making buttons or similar articles from sheet metal. It is an object of the invention to provide a machine whereby the various steps in the construction of such articles may be carried out automatically and without further attention on the part of the operator than is required to insure a continuous supply of material to the machine.

As herein shown the body of the button is formed from sheet metal by the action of coöperating forming dies and a wire eye or shank is presented in position within the button blank and then permanently secured in place by having the blank closed upon it. An important feature of the invention consists in means for forming a complete hollow button body, which shall be substantially closed around its shank or eye, out of a unitary sheet metal blank, in combination with means for presenting an eye or shank in position to be secured therein. It is believed that prior to the present invention mechanisms for carrying out these operations have never been combined in coöperative relation in a unitary machine. In the preferred embodiment the blank cut out of the sheet metal is angular in form and when cupped by the forming dies, will have upstanding projections along its edge. After the eye has been presented in position in the cupped blank, which position is preferably predetermined with respect to the upstanding projections, the latter will be turned in to close the blank and will be brought into holding engagement with the previously formed eye. Either during this operation or following it the button is given its desired shape and is delivered from the machine as a completed article.

Another feature of the invention consists in the combination of means for forming a completed button from a unitary sheet metal blank, with mechanism for forming an eye from a wire and for bringing the blank and eye together. Mechanism for forming an eye from wire has been heretofore known, as shown for example in my Patent No. 1,128,352 granted February 16, 1915, but it is believed that such mechanism has never before been combined with means for forming a completed button from a unitary sheet metal blank.

The invention includes new and improved mechanism for handling and cutting off a strip of sheet material suitable for the construction of a button blank, and novel dies for forming such material into a blank of the required shape. It also includes novel mechanism for feeding and cutting wire from which to construct an eye, for transferring the wire to the eye forming mechanism and for transferring the completed eye from such mechanism to the button blank. While each of these mechanisms of itself possesses many features of novelty, the combination of any two or more of such mechanisms as elements of a unitary machine or their operation in coöperative relationship from a common actuator is also believed to be novel.

These and other features of the invention will be best understood and appreciated from the following description of a preferred embodiment thereof selected for purposes of illustration and shown in the accompanying drawings, in which,—

Figure 1 is a view in perspective of the entire machine;

Fig. 2 is a view in perspective of portions of the machine seen from the rear, showing the strip metal working instrumentalities;

Figs. 3 to 6 are detail views of the strip metal working instrumentalities;

Fig. 7 is a sectional view of one pair of forming dies showing a partially completed button in place;

Fig. 8 is a view in perspective of mechanism associated with that shown in Fig. 7;

Fig. 9 is a view in perspective of the eye holding tool shown in Fig. 7;

Figs. 10 to 15 are views in perspective of various portions of the wire handling mechanism;

Fig. 16 is a view in side elevation of the eye-twisting mechanism;

Fig. 17 is a fragmentary view of a portion of the wire handling mechanism;

Figs. 18, 19 and 20 illustrate details of the eye-twisting mechanism;

Figs. 21 to 24 illustrate various features of the mechanism for placing the completed eye in the button blank;

Fig. 25 is a sectional view of the second pair of dies to operate upon the sheet metal blank, showing a partially formed blank;

Fig. 26 is a sectional view of the third pair of dies;

Fig. 27 is a view of the completed button, and

Fig. 28 is a sectional view of the fourth pair of dies.

Figures 10, 11, 12:
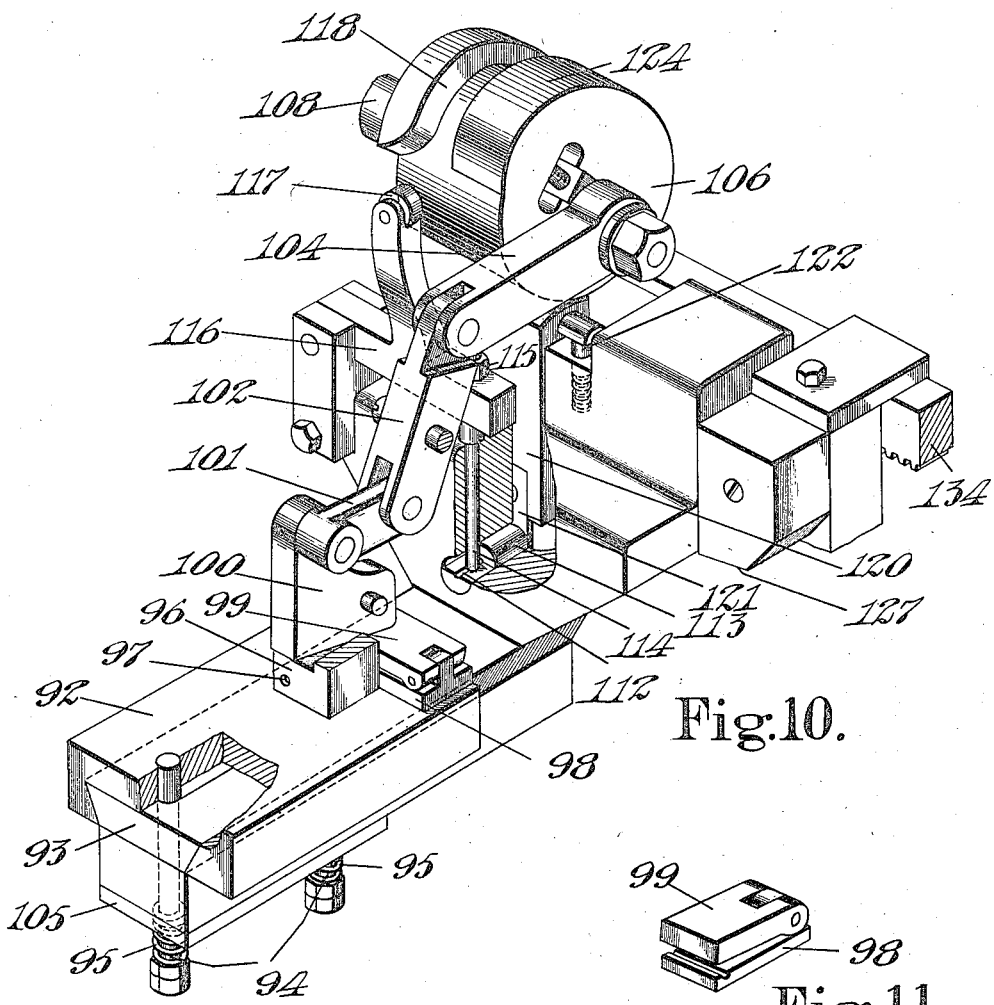

The machine herein illustrated is organized to receive material for the body of the button in the form of strip metal and to shape from this material by the action of suitable dies a sheet metal button of the desired shape. The material from which the eye is made is fed to the machine in the form of a continuous wire and mechanism is provided for shaping from the wire each individual eye and for inserting an eye in the partially completed button at the proper point in the process of its manufacture.

The machine is provided with a main shaft 4 journaled in the upper portion of the frame 2 and provided at one end with fast and loose pulleys for a driving belt. The shaft 4 carries a series of five cams 6 which operate to depress respectively five plungers 12, 14, 16, 18 and 20 guided for vertical reciprocation in the frame. The cams are so timed as to depress the plunger 12, which performs the first operation on the sheet metal blank, earlier than the remaining plungers which operate substantially simultaneously. The plungers are lifted by a series of cams 21 on the shaft 4 located adjacent to the cams first mentioned and each connected to its plunger through a vertical sliding rod 26 carrying near its upper end a cam follower arm 28 and at its lower end a forwardly projecting arm 30 which passes through a slot in the plunger.

At its left end (Fig. 1) the shaft 4 carries a beveled gear 32 meshing with a beveled gear 33 upon the upper end of a vertical crank shaft 34. The crank shaft serves to reciprocate horizontally a feed slide 36 to which it is connected through a slotted link 38 and a pin 39 on the slide. The link 38 carries an adjustable stop piece 40 by which the effective length of the slot can be varied and the throw of the feed slide thus regulated.

Each of the plungers 12, 14, 16, 18 and 20 carries a tool and these tools are arranged to operate successively upon the sheet metal blank used in producing the button. The blank as presented to the first tool 41 is substantially a square sheet and is fed in and severed from a continuous strip or coil by mechanism which will now be described. The strip 300 as shown in Fig. 2 is fed into the machine from its rear side and at a point opposite to the plunger 12. The metal strip passes into a guideway 47 after being drawn across a pad disposed in an oiling chamber 48 by which the strip is given a coating of oil. A pair of positively driven feed rolls 49 and 50 engage the strip as it passes through the guideway 47 and impart an intermittent advancing movement to it. The upper feed roll 49 is pressed downwardly by a leaf spring 51 arranged to bear above its journals and carries at its outer end a pinion 52. The shaft 53 of the lower feed roller carries a pinion 54 meshing with the pinion 52 and also carries a ratchet wheel 55. A pawl arm 56 is journaled upon the shaft 53 and provided with a driving pawl 57 which advances the ratchet wheel 55 when the pawl arm 56 is oscillated through a link 58 to which it is pivotally connected. The link 58 is connected to the upwardly extending arm of a bell crank lever 59 pivotally mounted at one side of the frame and having its other arm connected to an upwardly extending connecting rod 60. The connecting rod 60 is adjustably connected to a slotted crank disk 61 secured to the outer end of a stub shaft journaled in the machine frame 2 at the rear of the main shaft 4 and driven from the main shaft through a gear 62 meshing with a gear, not shown, on the shaft 4. By moving the point of connection of the rod 60 and the crank disk 61 with reference to the center of the disk the extent of feeding movement of the feed rolls 49 and 50 may be regulated. Adjacent to the ratchet wheel 55 and surrounding the shaft 53 is a friction disk 64 which prevents reverse movement of the ratchet wheel and also steadies the feed shaft.

The advancing end of the metal strip is severed in the guideway 47 after passing the feed rollers by a vertically reciprocating shear blade 66 which coöperates with a stationary shear block 10 in the bottom of the guideway as shown in Fig. 4. The shear blade 66 is carried by the upper offset end of a plunger 67 and normally bridges the guideway. The plunger 67 is guided for vertical movement and has adjustably secured to its lower end a contact block 68 upon the upper surface of which bears one end of a short operating lever 69. The lever 69 is pivotally mounted between ears on the lower surface of the frame and rests at its rear end on an actuating cam 70 on the lower cam shaft 71. The cam 70 is shaped to elevate the rear end of the lever 69 at the proper point in the cycle of the machine and the movable shear blade 66 is thereupon depressed and severs a square blank from the end of the metal strip. The plunger 67 is lifted and normally maintained in elevated position by a tension spring 73 extending between the body of the plunger and part of the stationary frame. The cam shaft 71 has secured to its outer end a beveled gear 72 meshing with a beveled gear 46 upon the lower end of the vertical crank shaft 34 above described.

The plunger 67 is mounted to slide in a block 5 which is secured to the frame of the machine and in this block beneath the path of the metal strip is a socket for the reception of a yieldingly mounted block 7, see Fig. 4. The block 7 is provided with a downwardly extending shank encircled by a compression spring 8 by which the block is normally maintained with its upper surface flush with the surface of the guideway 47. When the plunger 67 is depressed in the shearing operation the movable blade 66 and the end of the strip pass slightly below the surface of the stationary shear block 10 and when the plunger 67 is again elevated the block 7 acts as a stripper to elevate the end of the strip so that it may pass over the shear block 10 in the subsequent feeding operation. The block 7 also acts to clamp the end of the strip firmly against the under side of the end of the plunger 67 while the latter is being moved so that the position of the end of the strip is at all times controlled.

Each square blank as it is severed from the strip is pushed along the guideway 47 by the advancing end of the strip, there being space for three blanks in the guideway between the point of severance and the position in which the blank is operated upon. The guideway 47, which as shown in Fig. 4 comprises a base plate 47' and a removable cover plate 9 grooved on its lower side, directs the square blanks successively into position above a perforation 74 which constitutes the female member of the first pair of drawing dies. The tool 41 carried by the plunger 12 constitutes the male die and is shaped to force the blank downwardly through the hole 74, bending the corners of the blank upwardly and imparting to it a cylindrical shape as shown in Fig. 6. This operation constitutes the second step in the production of the button.

Beneath the guideway 47 for the metal strip and sheet metal blanks there is disposed a second guideway 76 extending at right angles to the guideway 47 and containing the feed slide 36. At its right hand end, Fig. 2, the feed slide is provided with a block 77 in which is formed a socket to receive the blank delivered through the hole 74 in the guideway plate 47'. In its initial position the feed slide 36 presents the socket beneath the hole 74 and in its first feeding movement the slide 36 carries the blank from beneath this hole into line with the tool 42 which is the second to act in the series of tools. As soon as the blank has been carried through the hole 74 its upwardly bent points expand slightly so that they encounter the under side of the guideway plate 47' when the tool 41 moves upwardly and consequently the blank is stripped from the tool. A stripping pin 78 is arranged within the tool 41 to assist in separating the blank from the tool after the latter has completed its function. This pin 78 normally projects below the bottom of the tool 41, as shown in Fig. 5, under the pressure of a spring 41$^a$ within the plunger 12 but is forced upwardly into the tool while the tool is moving downwardly in contact with the blank. When the tool 41 begins to move upwardly the pin 78 holds the cupped blank in its socket until the tool has moved substantially out of engagement with the blank.

The tool 42 is carried by the second plunger 14 and constitutes the male die of the second pair of drawing dies. It is of smaller diameter than the tool 41 and disposed in alinement with a hardened and perforated block 88 set in the bottom of the guideway 76 and constituting the female member of the pair. As shown in Fig. 25 the opening of the die 88 is of a diameter sufficient to receive the blank formed by the first pair of dies as it is delivered by the open ended block 77 in the slide 36. It is provided with an inwardly tapering surface 89 which merges into a portion of reduced diameter. The bottom of the die is formed by the concave surface of the upper end of a rod 91 which extends downwardly through the guideway 76 and is elevated at the proper point in the cycle of the machine by a cam, not shown, on the cam shaft 71 for the purpose of lifting the blank out of the die 88 and into the path of a pair of carrying fingers 79. It will be noted that the block 77 is provided with a lateral slot 77' of a size to permit the movement of the slide 36 even though the die 42 is threading the block. The lower end of the male die 42 is convex in shape and a corresponding shape is imparted to the button blank by the action of this die and the concave surface of the rod 91.

The feed slide 36 is provided with three pairs of carrying fingers 79 of which the pair nearest the right end of the slide serves to engage the blank as it is held by the tool 42 and then carry it into line with the third die 43. This die is shaped to roll inwardly the upstanding edges of the blank to bring them into engagement with one another and practically to close the button and it also acts to place the eye in position within the blank. The mechanism for forming and feeding the eye will be described hereinafter.

The die 43 is carried by the plunger 16 and acts in coöperation with a female die member 81 set in the bottom of the guideway 76 and in line with the die 43. The die 43 has a longitudinally extending bore in which is mounted a tool 83 for placing and holding the eye within the blank. As shown in Fig. 9, the end of the tool 83 is curved and provided with a groove shaped to fit the top of the eye. At its upper end the tool 83 is provided with a triangular head 80 which slides in a correspondingly shaped bore in a socket piece fast in the plunger 16, the tool 83 thus being prevented from twisting. Above the head 80 is disposed a spring 84 acting normally to hold the tool 83 protruded.

It will be noted that the lower end of the die 43 has substantially parallel annular walls within which the partially completed button may occasionally stick. In order to prevent this occurrence, provision is made for positively ejecting the button and to this end a pin 85 is mounted in a bore in the plunger 16 and is normally elevated by the spring 84 above mentioned. The upper end of the pin 85 is beveled and arranged in the path of a cross pin 86 slidably mounted in a bore in the plunger 16 and having its inner end beveled. The outer end of the pin 86 is arranged to slide in a groove formed in a piece 87 (Fig. 8) set in a portion of the machine frame and having an inclined bottom by which the pin 86 is forced inwardly when the plunger 16 begins to move upwardly after the operation of the dies 43 and 81. This movement of the cross pin forces the ejector pin 85 downwardly and, as at this point in the cycle of the machine the pin 85 is engaged with the head 80, the tool 83 is positively advanced and the completed button forced out of the die 43 and into position between the second pair of carrying fingers 79 which are at this time located in the position to the right of that seen in Fig. 2.

After the operation of the die 43 the second pair of carrying fingers 79 retain the partially completed button and when the feed slide is next advanced the button is carried into line with the die 44 carried by the plunger 18. This die coöperates with the female die member 75 in flattening a portion of the underside of the button. This action will be apparent by comparing the button shown in Fig. 27 with the partially completed button shown in Fig. 26.

In the next reciprocation of the feed slide 36 the third pair of carrying fingers engage the completed button while the latter is still held by the die 44 and when the feed slide is advanced the button is carried into position beneath the last tool 45 of the series. This tool may be used to perform any desired operation upon the finished button, such as forming indentations therein for purposes of anchoring a plastic coating or it may be used, as in the present case, for ejecting the complete button from the carrying fingers when the latter convey it to an opening in the bottom of the guideway 76 through which it may pass to any desired receptacle. In order to lift the button blank upwardly from the female members of the series of dies, knock out pins are provided in the case of dies 81 and 75 and the rod 91 in the die 88 has a similar function. These pins and rod extend downwardly through the guideway 76 where they are acted upon at the proper time in the cycle of the machine by cams 64 on the cam shaft 71 as shown in Fig. 2.

The wire 302 is fed to the machine from the side opposite to the metal strip as shown in Fig. 1. It passes first through two series of straightening rollers 90, one series being disposed at right angles to the other and then passes to the wire feeding mechanism by which the wire is pulled through the straightening rollers and advanced to the cutting off means. The wire feeding mechanism is carried by a horizontally reciprocating slide 92 mounted upon a dovetailed bar 93 projecting outwardly from the frame of the machine. The feed slide 92 is held in place and steadied in its movement by a friction plate 105 connected to the feed slide by a pair of bolts 94 and pressed against the bottom of the guideway bar 93 by springs 95. Secured to the upper surface of the feed slide 92 is a block 96 having a passage 97 for the wire and an upwardly extending arm which carries the fulcrum pin of an oscillating feed dog 100. Immediately in the rear of the block 96 is disposed a pair of wire gripping plates of which the plate 98 is stationary and provided with a channel for the wire as shown in Fig. 11 and the other plate 99 is hinged upon the plate 98. At its upper end the feed dog 100 is pivotally connected to a link 101 which in turn is connected to a lever 102 pivotally mounted upon an arm 103 projecting from the machine frame. At its upper end the lever 102 is connected to a crank link 104 which is adjustably secured to a cam 106 on the shaft 108. When the cam 106 is rotated in such direction as to move the link 104 toward the left as seen in Fig. 10 the feed dog 100 is swung about its pivot in a clockwise direction and consequently presses downwardly the hinged plate 99 into clamping engagement with the wire. The continued movement of the cam thereupon causes the feed slide to move inwardly advancing the wire with it. In the reverse movement the feed dog is swung in the opposite direction releasing the wire so that the gripping plates 98 and 99 will merely slide over it on the reverse stroke of the feed slide. By changing the point of connection between the link 104 and the cam 106 the length of the feeding stroke may be regulated and adjusted in accordance with the requirements of the work in hand.

After passing through the gripping plates 98 and 99 the wire enters a channel 112 formed in a hardened cylindrical plug 113 set in an opening in the machine frame. The upper half of the plug 113 is cut away for a portion of its length thus leaving the channel 112 open. At this point there is arranged a presser bar 114 by which the end of the wire is clamped and held stationary during the outward or reverse movement of the feed slide. The presser bar 114 is loosely journaled in a vertical bore in the frame and provided with a head which is disposed beneath the outer end of a cam lever 116 pivotally mounted in the machine frame and carrying a cam roller 117 arranged to be acted upon by a cam projection 118 on the periphery of the cam 106. In order to regulate the action of the cam lever 116 upon the presser bar 114 an adjustable stop 115 is set in the end of the lever 116 above the head of the presser bar.

The advancing end of the wire projects entirely through the plug 113 and is sheared off at the rear end surface of the plug by a movable shearing member 121, the plug itself constituting the stationary shearing member. The shear member 121 is mounted in the lower end of a vertically movable slide 120 guided in ways formed in the frame of the machine and normally held in its elevated position by a pair of spring plungers 122 arranged one on either side of the slide and bearing beneath the bosses projecting outwardly from the slide. The slide 120 is depressed in the shearing operation by a cam projection 124 on the periphery of the cam 106. The shaft 108 carrying this cam also carries a pinion 110 meshing with a pinion 62 which in turn is driven from the main shaft as already stated.

The advancing end of the wire in passing out of the plug 113 before it is severed enters one of two swinging carriers 126 shown in Figs. 13 to 15. The carriers are mounted upon opposite sides of the machine and during the wire feeding operation one carrier is maintained with its wire receiving end opposite to the plug 113. Each carrier is slotted at its end and provided with a lip for the wire and a pair of retaining springs 130 which hold the wire against the lip from the time it enters until it is delivered to the eye twisting mechanism.

Each of the carriers is mounted rigidly upon the end of a shaft 128 which is bored to receive a rod 125 carrying at its rear end a friction disk 133. Loosely mounted upon the shaft 128 is a pinion 132 but frictionally connected to the shaft by the disk 133 which is drawn inwardly by a spring 129 encircling the outer end of the rod 125 and bearing at its inner end upon the end of the shaft 128. Each of the pinions 132 is arranged to mesh with a horizontally movable rack 134 mounted in transverse guideways in the machine frame and provided with a downwardly extending stem 135. An operating rod 136 is connected to the stem 135 at its inner end and to a bell crank lever 140 at its outer end. The bell crank lever 140 in turn is connected to a cam lever 144 by a vertically disposed link 142 as shown in Fig. 13. The cam lever is oscillated to reciprocate the rack by a cam 146 on the shaft 148. The shaft 148 is journaled in bearings at the front of the frame and at its left end, see Fig. 1, carries a gear wheel 150. This in turn meshes with a pinion 152 on one end of a sleeve 153 which carries at its outer end a gear wheel 156 meshing with a pinion 158 on the cam shaft 71 above mentioned. It will thus be seen that through the mechanism above described the carriers 126 will be swung alternately into a substantially horizontal wire receiving position and then into a substantially vertical wire delivering position.

In severing the end of the wire the portion sheared at the rear surface of the plug 113 is carried downwardly by the movable shear blade 121 and, in order that it shall not be forced from beneath the retaining spring 130 of the carrier, provision is made for simultaneously lowering the carrier independently of its regular delivering movement. To this end an adjustable stop 137 projects downwardly from the surface of the slide 120 of the movable shear blade and the set screw 138 is provided for retaining the stop in an adjusted position corresponding to the thickness of the wire in use or other conditions encountered. This movement of the carrier takes place independently of the regular operating mechanism above discussed and is permitted by the frictional connection between the shaft 128 and the pinion 132.

It is important in view of the small diameter of the wire to be dealt with that the carrier should be located in the proper receiving position and to this end a positive stop comprising a block 127, see Fig. 10, is so disposed as to be encountered by the upper surface of each carrier when the latter is moved into receiving position. The movement of the rack 134 is slightly greater than is sufficient to move the carrier into receiving position, the excess movement of the rack being taken up as lost motion in the frictional connection between the disk 133 and the pinion 132.

Fig. 16 illustrates one of the carriers 126 in its delivering position in which the severed portion of the wire is ready to be delivered to the eye-twisting mechanism. This mechanism, as shown in Fig. 16, comprises a tool holder 160 in the form of a disk having radially disposed guideways for a series of bending tools and a centrally disposed cylindrical former 161. The first bending tool 162 to operate has a concave end and acts to force the end of the wire against the stationary former 161 and bend its ends into substantially parallel position. After the operation of the tool 162 the side bending tools 163 and 164 are advanced to complete the periphery of the eye by bending the parallel arms of the partially formed eye blank. The last tool of the series to operate is the tool 165 which is advanced to engage the out-turned feet of the eye and is twisted to turn the ends of the feet in opposite directions. The bending tools are actuated in their radial movement by cam slots in a disk 182 which surrounds the holder 160, each of the tools carrying at its outer end a pin which runs in the cam. The bending mechanism *per se* is not claimed herein as it forms the subject-matter of my Patent No. 1,128,352, granted February 16, 1915.

The rotatable portion of the tool 165 is formed with a pinion 169 which meshes with a rack 168 guided for movement in ways on the holder 160 and having at its outer end a cam roller which runs in a cam track 167 formed in a plate which is secured to the disk 182. The cams 166 and 167 are so proportioned as to advance the tools successively to perform their different operations upon the wire when the disk 182 is rotated through about 60°. The disk 182 is operated by the oscillation of a toothed segment 184 pivoted to the machine frame and connected by a link 186 with a cam lever 188 which in turn is oscillated by a connection with a cam in a cam disk 190 secured to the shaft 148.

It will be apparent that there are two complete eye-twisting mechanisms embodied in the machine which are located (see Fig. 1) upon opposite sides of the wire feeding and cutting mechanism and that they receive alternately a piece of wire from one of the carriers 126 which wire is removed from beneath the retaining springs 130 of the carrier by the movement of the bending tool 162. As soon as the wire is engaged by the tool 162 the carrier 126 is slightly lifted by a cam 183 on the periphery of the disk 182 and so moved out of the path of the tool 162.

It will be apparent that the slotted end of the carrier 126, when in its delivering position, fits over the tool 162 so that the severed portion of the wire is brought into the path of the latter. After the eye has been completed it is removed from the eye-forming mechanism by means which will now be described.

The former 161 is set in the end of a rod 170 in the surface of which is formed a pair of oppositely disposed slots for the reception of a pair of pushing fingers 171 having their outer ends bent inwardly into engagement with the former 161. At their outer ends the fingers 171 are fitted within slots in a head 172 having a stem 173 adapted to enter a bore in the outer end of the rod 170. The head 172 is pivotally secured to the inner end of a lever 180 pivoted on the machine frame and shown in Fig. 13. The lever 180 is connected through the link 174 to a cam lever 175 carrying at its lower end a cam roller 176 which is acted upon by a cam piece 177 on the cam disk 146 above mentioned. Through the mechanism above described the pushing fingers 171 are advanced after the eye has been completed and the eye pushed off of the former 161 and upon a split pin carrier 196. Movement of the pushing fingers 171 in the reverse direction is effected through a cam follower 178 fitted to swing about a pin 179 set in a bracket as shown in Fig. 13, the cam follower 178 being arranged to extend in the path of the cam 177 at its outer end and having an inwardly extending tail shaped to bear upon the inner side of the lever 175 just below its pivot point.

The mechanism for twisting the eye and for removing the completed eye from the twisting mechanism has been explained and it now remains to describe the mechanism for transferring the completed eye to the partially formed button blank. There are provided two split pin carriers 196 each shaped at its end to enter the completed eye and frictionally retain it while having a shoulder to limit the movement of the eye upon the pin. Each carrier pin is mounted in the outer end of a plate 197 hinged to a slide plate 195 and guided for radial movement in ways formed in a pair of arms 194 extending at right angles to each other from a central hub 192. The hub is fast to the upper end of a shaft 198 carrying at its lower end a pinion 200 meshing with a rack 202. The rack 202 carries a cam roller arranged to run in a cam track 206 in a cam disk on the shaft 148. The cam is so designed as to swing the head to bring one arm alternately into receiving position opposite the former 161 of one of the eye-twisting mechanisms and then to carry the completed eye into delivering position while at the same time the other carrying pin is moved from delivering position into receiving position at the other eye-twisting mechanism. Each of the slide plates 195 is provided with an upwardly extending pin 199 at its inner end which is arranged to run in a U-shaped track formed in the under surface of a plate 201, see Fig. 22. Plate 201 is guided for movement from front to rear in ways formed in a bracket 204 fast to the frame and has an outwardly extending shank 203 to which is pivotally connected the upper end of a cam lever 205. The cam lever 205 is oscillated by a cam 207 on the shaft 148. When the slide 201 is advanced the slide plate 195 and split pin carrier which happen to be in alinement therewith are also advanced, the pin 199 at this time occupying a position at the center of the band of the U-shaped track in the slide 201. During this movement of the slide the pin 199 of the other slide plate 195 will merely play idly in the straight portion of the U-shaped slot.

It is important that the eye should be presented accurately in position above the button blank and to this end the head 192 is locked while the eye is being so presented. Each of the arms 194 is provided with a pair of downwardly extending lugs 208 between which is received an oscillating locking piece 210 fast to the inner end of a shaft 212 journaled in the machine frame. At its outer end the shaft 212 carries an arms 213 by which it is connected through the link 214 to cam lever 216. The cam lever 216 is oscillated to lock and unlock the head 192 by means of a cam 218 on the cam shaft 71.

When the slide 201 is advanced to present the completed eye the split pin carrier reaches a position in alinement with the die 43 holding the eye in position beneath the tool 83. The cylindrical button blank is held in place by one pair of retaining fingers 79 and that finger which underlies the split pin 196 has a recess to permit the pin to be lowered without obstruction in placing the eye in the blank, as shown in Fig. 24. The blank itself is retained with the depression between two of its upstanding points beneath the split pin 196. When the die 43 is depressed the tool 83 engages the eye and swings the pin 196 and the hinged plate 197 downwardly sliding the eye off of the pin and placing it upon the bottom of the button blank. The slide 201 is then retracted and the plate 197 returned to its initial position by a leaf spring 193, see Fig. 23. After the eye has been delivered to the blank the die 43 acts to close in the upstanding rib thus holding the eye permanently in place. The partially completed button is then advanced to the remaining dies of the series and finally the finished button is ejected from the machine.

In general, then, the machine comprises a series of die carrying plungers 12 to 20 which are arranged along a straight path extending longitudinally of the machine and these plungers are depressed by cams 6 (Fig. 2) and lifted by cams 21. The feed slide 36 is reciprocated along this path by the crank shaft 34 and link 38 (Fig. 1). It will be noted that the movement in one direction takes place when the tools are holding the partially formed button blanks and in the opposite direction when the button blanks are free to be moved along to the next position. The metal strip 300 is intermittently fed through the guideway 47 (Fig. 3) by feed rolls 49 and 50 (Fig. 2). Having first been coated with oil in the oiling chamber 48, the strip is then cut off by the shear plate 66 working against the shearing block 10 (Figs. 3 and 4) and the end of the strip which has been depressed in the shearing operation is elevated by the spring-pressed block 7 so as to pass over the shear block 10. The guide-way 47 is of such a length that a plurality of blanks are held therein edge to edge between the shear block and the first die 41, the blanks being fed along the guideway by the advancing end of the strip.

The foremost blank is pressed into the die 74 by the tool 41 thus bending up its corners and giving it a cylindrical shape, as shown in Fig. 6. Continued movement of the tool 41 forces the cupped blank into a socket in a block 77 carried by the slide 36 after which the slide moves to the position shown in Fig. 2 so that the blank is placed beneath the tool 42 which forces it into the die formed in block 88 set in the guideway 76 thereby reducing its diameter and giving its end a convex face. As the tool 42 retreats the blank is lifted out of the die 88 by the plunger 91 and is grasped by the first pair of fingers on the slide 36 and carried to position beneath the tool 43. This die 43 (Figs. 7 and 26) is constructed to roll in the edges and upstanding points of the blank after a previously formed eye has been presented in fixed relation to the blank by one pair of split fingers 196 of the eye transferring mechanism (Figs. 21 and 1).

The wire from which the eye is formed is fed into the machine on the side opposite to that on which the metal strip is supplied and the wire drawn through straightening rollers 90 (Fig. 1) by gripping plates 98 and 99 (Fig. 10) carried on a reciprocating slide 92. These plates are intermittently clamped upon the wire by a cam operated dog 100 and the wire is thereby fed through the plug 113 where it is clamped by the presser bar 114 during the reverse movement of the feed slide. The end of the wire projecting through the plug 113 enters one of the carriers 126 (Figs. 1, 13 and 14) and is sheared off by the shearing member 121 in coöperation with the end of the plug (Fig. 10). Movement of the carrier 126 about its axis to a vertical position delivers the piece of wire to a former 161 of one of the eye-twisting mechanisms located upon opposite sides of the wire feeding and cutting mechanism (Fig. 1). The eye-twisting mechanism with its rotating tool holder 160 performs successive operations of bending and twisting the straight piece of wire until it assumes the form shown in Fig. 19.

The completed eye is then pushed off the former 161 by fingers 171 (Figs. 19 and 20) on to one of the split pin carriers 196 (Figs. 21 to 24) mounted on the oscillating hub 192. This hub with the attached carriers is then rotated to bring the carrier holding an eye into position opposite the die 43 and the carrier is pushed forward by the slide 201 until the eye is under the tool 83 carried by the die 43. Descent of this tool pushes the eye against the bottom of the button blank and holds it there in predetermined relation to the irregular edge of the blank and at the same time removes it from the end of the carrier 196 as the latter is retracted to allow the descent of the die 43 to roll over the edges of the blank (Fig. 26) to close the hollow button and thereby secure the eye in position.

The second pair of carrying fingers 79 will then, upon movement of the slide 36, transfer the button into position in line with the die 44. This die will coöperate (Fig. 28) with the member 75 to flatten the under side of the button (Fig. 27). Upon the next reciprocation of the slide 36, the button will be grasped by the third pair of carrying fingers 79 and moved into line with the tool 45 which may be used for any desired operation or for ejecting the finished button through an opening in the bottom of the guideway 76 into a suitable receptacle.

The machine hereinabove described may be employed with good advantage in the production of buttons of the type disclosed and claimed in Letters Patent of the United States No. 1,203,245, granted October 31, 1916, upon my application, although with suitable modification in the shape of the dies buttons of other characteristics may be readily produced by the machine.

The various steps in the production of the button herein disclosed may be carried out by a variety of different mechanisms and consequently the method of making a button is not claimed herein but forms the subject-matter of Letters Patent of the United States No. 1,257,731, granted February 26, 1918, upon my application.

Having thus described my invention, I claim as new and desire to secure by Letters Patent of the United States:

1. A button making machine having, in combination, dies for forming a concave sheet metal blank with upstanding projections, and means for placing an eye within the blank and closing the projections of the blank upon the eye.

2. A button making machine having, in combination, means for holding a concave sheet metal blank with upstanding projections, and a tool for positioning an eye within the blank in predetermined relation to said upstanding projections and closing the blank to hold the eye.

3. A button making machine having, in combination, means for holding a cupped sheet metal blank with upstanding projections, means for presenting an eye in a position opposite to the blank in predetermined relation to said projections, and a tool movable relatively to the blank for locating the eye in the blank.

4. A button making machine having, in combination, means for holding a cupped sheet metal blank, means for presenting an eye in position within the blank and for holding it against angular movement, and means for closing the blank upon the eye while the eye is so held.

5. A button making machine having, in combination, a die for holding a cupped sheet metal blank, a tool having a slot in its end to receive a portion of an eye and hold the eye against angular movement, said tool being movable to place the eye in position within the blank.

6. A button making machine having, in combination, a die for holding a cupped blank, a coöperating die for closing the blank, and a tool yieldingly mounted within said coöperating die for placing an eye within the blank prior to the action of the dies.

7. A button making machine having, in combination, means for cutting out a sheet metal blank, coöperating dies for forming a cupped blank therefrom, means for transferring the blank from the cutting out device to the cupping dies, a second set of dies, one of which contacts with the upstanding edges of the cupped blank, for closing said blank, and feeding means for carrying the blank from one set of dies to the other.

8. A button making machine having, in combination, means for cutting out an angular sheet metal blank, coöperating dies for forming a cupped blank therefrom with an upstanding point, a device for presenting a previously formed eye to the recessed side of the blank so formed, means for feeding the blank from the dies to the eye-presenting device, and means for bending said point into holding engagement with said eye.

9. A button making machine having, in combination, coöperating dies for forming a cupped blank, a device for presenting an eye to the blank so formed, means for feeding the blank from the dies to the eye-presenting device, and means for closing the blank upon the eye.

10. A button making machine having, in combination, coöperating dies for forming a cupped blank, a device for presenting an eye to the blank so formed, means for feeding the blank from the dies to the eye-presenting device, means for closing the blank upon the eye, and a pair of dies for changing the shape of the closed blank.

11. A button making machine having, in combination, coöperating dies constructed and arranged to form a cupped button blank and to bend in its rim to act as an eye-retaining marginal portion, and coöperating dies constructed and arranged to flatten the surface of said marginal portion.

12. A button making machine having, in combination, coöperating dies for forming a cupped blank out of sheet metal, a device for supporting an eye for presentation to the blank so formed, means for effecting relative movement of the blank and said device to bring them into coacting relation, and means for closing the open end of the cupped blank around the eye arranged to form a hollow substantially closed button.

13. A button making machine having, in combination, coöperating dies for forming a cupped blank out of sheet material, eye forming mechanism, means for bringing an eye and a blank together, and means for acting upon said blank to bring the upstanding edges of the blank together around the eye arranged to form a complete substantially closed hollow button out of a unitary sheet of material.

14. A button making machine having, in combination, means for feeding an angular sheet metal blank along a predetermined path, dies for shaping the blank at various points in its path including dies for forming it into a cup with upstanding points, and means for delivering an eye to the recessed side of the blank movable laterally between said points while the blank occupies a predetermined position in said path.

15. A button making machine having, in combination, means for placing an eye within a cupped sheet metal blank, dies for closing the blank with a convex surface surrounding the eye, and another die arranged to flatten said convex surface.

16. A button making machine having, in combination, means for placing an eye within an inverted sheet metal button blank, dies for closing the blank leaving it with a curved surface disposed about the eye, and a die having a recess to receive the eye and a portion shaped to flatten said curved surface.

17. A button making machine having, in combination, means for placing an eye within a button blank comprising a split pin arranged to project through the eye and frictionally retain the same, and a tool shaped to fit the upper portion of the eye and movable at right angles to the pin.

18. A button making machine having, in combination, coöperating button forming dies, means for intermittently advancing a continuous strip of sheet material toward said dies, a straight blade for severing successive button blanks from said strip between each feeding step and means constructed and arranged to cause the advancing end of the strip to feed the blanks successively to the dies.

19. A button making machine having, in combination, coöperating forming dies, a guideway leading to said dies, means for feeding a continuous strip of material to the outer end of the guideway, and devices for cutting off portions from the end of the strip, said portions being fed along the guideway to the dies by the advancing end of the strip.

20. A button making machine having, in combination, coöperating forming dies, a guideway leading to said dies and constructed and arranged to receive at its outer end a continuous strip of metal, a fixed shearing member in said guideway, coöperating members arranged to grasp the upper and lower sides of the uncut strip, one of said members having a shearing edge, and means for moving said members across the guideway in one direction to shear off a blank and for moving them in the opposite direction to bring the end of the uncut strip opposite the guideway.

21. A button making machine having, in combination, an open bottomed forming die, a carrier provided with an aperture adapted to be positioned initially in alinement with and beneath said forming die, another set of dies comprising a plunger having a diameter less than the diameter of the aperture and a coöperating die located beneath said carrier, said carrier being provided with clamping fingers and a slot leading from said aperture to said fingers to permit movement of the carrier when threaded by said plunger.

22. A button making machine having, in combination, two sets of forming dies located at different levels, a movable carrier arranged on an intermediate level adapted to receive a blank from one set of dies and transfer it to the other set, and means for lifting the blank out of the second set of dies into the path of movement of said carrier.

23. A button making machine having, in combination, coöperating forming dies, a guideway leading to the dies and shaped to receive the end of a continuous strip and the blanks cut therefrom, movable shearing means coöperating with a fixed block located beyond the shearing means in said guideway to make a single cut across the strip and hence acting to depress the end of the uncut strip below the guideway in severing a blank, and depressible means for supporting the end of the uncut strip arranged to elevate it after each severing operation to bring it opposite the guideway.

24. A button making machine having, in combination, a pair of dies for forming a cylindrical blank arranged on one level, a second pair of dies of which the female member has an opening to receive the blank formed by the first dies and an inwardly tapering surface for reducing the diameter of said blank arranged on a different level, and transferring means on an intermediate level.

25. A button making machine having, in combination, means for producing a blank with a cylindrical upstanding rim and a substantially flat bottom, and coöperating male and female dies for simultaneously reducing the diameter of the blank and imparting a convex shape to its bottom.

26. A button making machine having, in combination, a die for holding a cylindrical sheet metal blank, an eye holding tool associated therewith, a die movable relatively to said tool having an annular cylindrical wall shaped to fit about the periphery of the blank outside of an eye held by said tool, and a circular transversely curved surface for rolling inwardly the points of the blank to close the blank and retain the eye.

27. A button making machine having, in combination, means for producing a cylindrical blank, and dies for shaping said blank including a female die having an opening of diameter sufficient to receive the blank, an inwardly tapering portion, a portion of reduced diameter, a bottom member having a concave blank-shaping surface, and a coöperating male die shaped to fit approximately said concave surface.

28. A button making machine having, in combination, a movable plunger having a blank closing die, an eye-holding tool movably retained therein, a spring for normally advancing said tool, an ejecting pin in line with the eye-holding tool, and means for advancing the pin when the plunger is moved to a predetermined position.

29. A button making machine having, in combination, means for moving a series of sheet metal button blanks along a predetermined path, a plurality of eye-forming mechanisms, and means for transferring an eye to each button blank at a predetermined position in its path, said eyes being transferred in alternation from the different eye-forming mechanisms to successive button blanks.

30. A button making machine having, in combination, means for presenting button blanks successively in eye-receiving position, a pair of eye-forming mechanisms, means for transferring eyes alternately from said mechanisms to that blank which is in eye receiving position, and a common actuator for said means.

31. A button making machine having, in combination, a plurality of eye-forming mechanisms, operating means constructed and arranged to operate said mechanisms successively, a transferring device associated with each mechanism and means arranged to operate said device at the conclusion of the eye-forming operation to remove the eye from its associated mechanism and deliver it at a common point.

32. A button making machine having, in combination, means for presenting button blanks in eye-receiving position, a pair of eye-forming mechanisms disposed on opposite sides of the eye-receiving position of the blanks, and transferring devices movable alternately from each eye-forming mechanism to deliver an eye to successive button blanks as they reach their eye receiving position.

33. A button making machine having, in combination, means for presenting button blanks in eye-receiving position, a pair of eye-forming mechanisms disposed on opposite sides of the eye-receiving position of the blanks, a movable transferring device associated with each eye-forming mechanism and arranged to carry an eye from said mechanisms alternately to button blanks, and means for removing each eye from the transferring device and positioning it in a blank.

34. A button making machine having in combination, eye-transferring mechanism including an arm mounted for turning movement, a slide movable in the arm, and an eye-retaining member mounted upon the slide, together with means for advancing or retracting the slide upon the arm to present an eye to operative position.

35. A button making machine having, in combination, eye-forming mechanism including a cylindrical former, and transferring mechanism for the eye including an eye-retaining pin constructed and arranged to be brought into line with the former to receive an eye therefrom.

36. A button making machine having, in combination, eye-forming mechanism including a projecting former, transferring mechanism for the eye including a split pin retainer, and means for moving an eye off the former and upon the split pin.

37. A button making machine having, in combination, eye-forming mechanism including a projecting former for an eye, transferring mechanism including a split pin constructed to hold an eye frictionally during the transferring operation, means for forcing an eye upon the retainer, and means for removing the eye at the conclusion of the transferring operation, 38. A button making machine having, in combination eye-transferring mechanism including a swinging arm, a slide movable upon the arm, a plate hinged to the slide, and an eye-retaining device on the hinged plate, together with means for removing the eye from said device and at the same time swinging the hinged plate toward the point of delivery.

39. A button making machine, having, in combination, eye-transferring mechanism including a swinging arm, and an eye-retaining device movable upon the arm, together with a lock for holding the arm in delivering position.

40. A button making machine, having, in combination, eye-transferring mechanism including a swinging arm movable from eye-receiving to eye-delivering position, and an eye-retaining device movable upon the arm, together with a lock for holding the arm in eye-receiving position.

41. A button making machine, having, in combination, eye-transferring mechanism including a swinging head having extending arms, means for delivering an eye to one arm, means for removing an eye from the other arm, and locking means for the head.

42. A button making machine, having, in combination, eye-transferring mechanism including a swinging head having outwardly extending arms, means for delivering an eye to each arm at different points, and means for removing eyes from the arms at the same point.

43. A button making machine, having, in combination, eye-transferring mechanism including a swinging head having arms extending at an angle to each other, eye-delivering mechanisms located upon opposite sides of the head, means for turning the head to bring the arms alternately into line with the delivering mechanisms, and means for removing an eye from one arm while the other is being supplied.

44. A button making machine, having, in combination, eye-transferring mechanism including a swinging head having radially extending arms, an eye-carrier movable upon each arm, and an operating slide movable transversely to the axis of the head and having connection with both eye-carriers.

45. A button making machine, having, in combination, wire feeding mechanism, means for cutting a portion from the advancing end of the wire, eye-forming mechanism, means for transferring the portions from the cutting means to the eye-forming mechanism, stop means associated with said transferring means in one position, and operating means for said transferring means frictionally connected thereto and arranged to urge said transferring means to a position beyond said stop means.

46. A button making machine, having, in combination, wire feeding mechanism, means for cutting successive portions from the advancing end of the wire, a plurality of eye-forming mechanisms, and means for transferring said portions to one eye-forming mechanism after another.

47. A button making machine, having, in combination, wire feeding mechanism, means for cutting successive portions from the wire, a button blank holder, means for transferring alternate cut portions of the wire by different paths to a blank in the holder, and means for forming each of said portions into an eye in transit.

48. A button making machine having, in combination, wire feeding mechanism, a movable carrier normally disposed in position to receive the advancing end of the wire, operating means frictionally connected to said carrier, and means for severing the portion of the wire in the carrier arranged to move the carrier in opposition to the force exerted by its operating means at the time of the severing action.

49. A button making machine, having, in combination, wire feeding mechanism, a movable carrier constructed and arranged to receive the advancing end of the wire, a movable wire cutting blade, and means for communicating the movement of the cutting blade to the carrier during the severing operation.

50. A button making machine, having, in combination, wire feeding mechanism, a movable carrier for receiving the advancing end of the wire, a movable wire cutting device, and an adjustable stop associated with said device and serving to displace the carrier in the same direction as the severed end of the wire.

51. A button making machine, having, in combination, a stationary shear member having a wire passage, a slide carrier arranged for reciprocation adjacent to the stationary shear member and having a shearing blade and an adjustable stop, a wire carrier yieldingly maintained in position to receive the end of the wire passing from the stationary shear member and arranged to be displaced by the stop as the end of the wire is carried out of line with the wire passage in the severing operation.

52. A button making machine, having, in combination, a carrier for a piece of wire comprising a slotted arm having wire engaging lips, and a retaining spring, and a tool for removing the wire from the carrier arranged to act in the slot of the arm.

53. A button making machine, having, in combination, a carrier for a piece of wire comprising a slotted arm and a spring for retaining a piece of wire in position across the slot, eye-forming mechanism including a projecting former and a relatively movable bending tool, and means for moving the carrier to bring the wire piece between the tool and the former.

54. A button making machine, having, in combination, means for cutting successive pieces from the end of a wire, a plurality of wire carriers constructed and arranged to occupy successively a position adjacent to the point of severance and means for operating one carrier after another to remove the severed end of the wire.

55. A button making machine, having, in combination, wire feeding means, a carrier movable toward or from the path of the advancing end of the wire, a stop for determining the receiving position of the carrier, and operating means having a slip connection with the carrier.

56. A button making machine, having, in combination, wire feeding means including a slide having a pair of relatively movable superposed plates with a wire passage between them, a dog pivotally mounted upon the slide adjacent to the plates, and operating mechanism including a link pivoted to the dog arranged to move the dog first to clamp the wire between said movable plates and then to advance the slide with the clamped wire.

57. A button making machine, having, in combination, means for holding a button blank, wire feeding means, means for cutting a portion from the end of the wire, eye-forming mechanism, means for transferring the wire to said mechanism, and means for transferring the completed eye from said mechanism to the blank.

58. A button making machine, having, in combination, means for advancing the end of a piece of wire into a predetermined position, a pair of wire carriers pivotally mounted upon opposite sides of said position and having each a connected pinion, and a reciprocatory rack meshing with said pinions and arranged to swing the carriers alternately to or from said position.

In testimony whereof I have signed my name to this specification.

FRANKLIN G. NEUBERTH.